July 24, 1956
E. F. BARNETT
2,756,387
MICROWAVE APPARATUS FOR MEASURING THE
IMPEDANCE OF WAVEGUIDE COMPONENTS
Filed June 4, 1954
FIG_1_
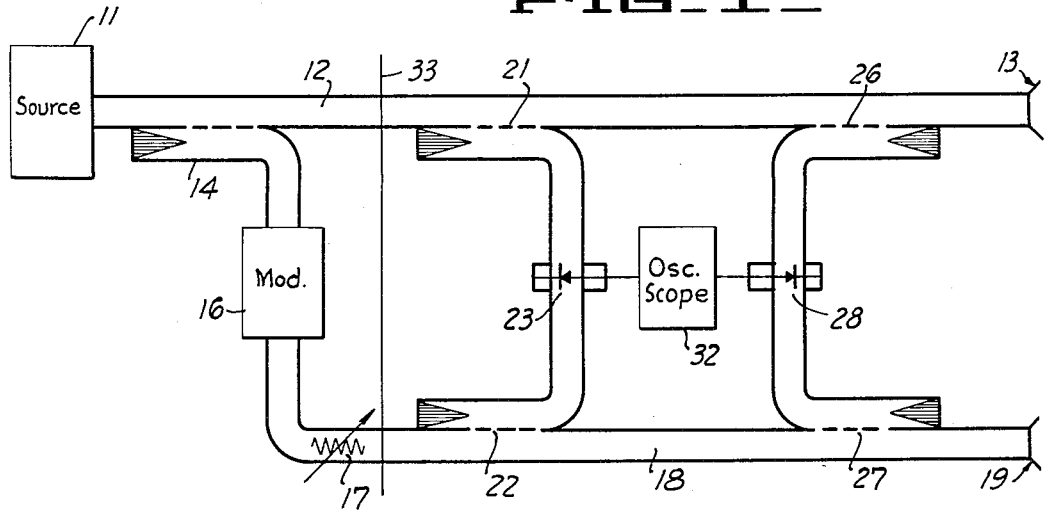
FIG_2A_
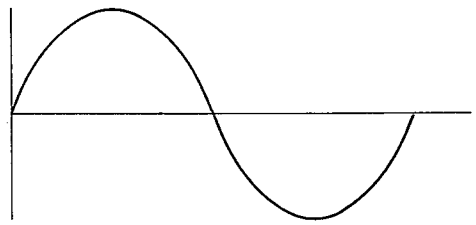
FIG_2B_
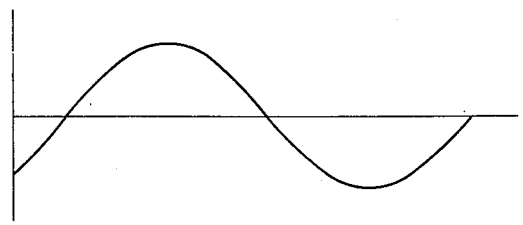
INVENTOR.
Edward F. Barnett
BY
*Fisher & Swain*
ATTORNEYS

United States Patent Office 2,756,387
Patented July 24, 1956

2,756,387

MICROWAVE APPARATUS FOR MEASURING THE IMPEDANCE OF WAVEGUIDE COMPONENTS

Edward F. Barnett, Stanford, Calif., assignor to Hewlett-Packard Company, Palo Alto, Calif., a corporation of California Application June 4, 1954, Serial No. 434,620

3 Claims. (Cl. 324—58)

This invention relates to microwave methods and apparatus for measuring the amplitude and phase of the impedance of waveguide components.

Swept-frequency impedance meters presently in use require that the power delivered from the source be independent of frequency. This is usually achieved by sampling the source power, applying the signal to an AVC circuit, including an amplifier, which drives an attenuator connected to the source. This combination maintains the power constant as the band of frequencies is swept. A single crystal detector is employed to detect the reflected energy. The detector must have a conversion efficiency which is constant over the band of frequencies swept. In general, detectors do not have a constant conversion efficiency over a broad band of frequencies, and therefore, the frequency band is limited.

It is an object of my present invention to provide an impedance meter and method for measuring the amplitude and phase of waveguide components which can be operated over a broad band of frequencies.

It is a further object of the present invention to provide an impedance meter which operates independently of source power.

It is still a further object of the present invention to provide an impedance meter and method in which the conversion efficiency of the detector need not be uniform over the band of frequencies measured.

Other objects and features of this invention will be better understood from the following description considered in connection with the accompanying drawing.

Referring to the drawing:

Figure 1 is a circuit diagram of one embodiment of my invention.

Figures 2A and 2B are curves showing the mixer output of the first and second mixers respectively.

In Figure 1 I have shown a source of microwave energy 11 connected to a waveguide 12. The source, for example, may be a klystron oscillator capable of generating a fixed frequency or a swept-frequency (i. e., varying continuously and automatically between fixed frequency limits) through a mechanical driving mechanism. The waveguide 12 is terminated in a reference waveguide component 13. A directional coupler 14 is connected to waveguide 12. Although various amounts of coupling may be employed, I prefer to use a 10 db directional coupler. Consequently, approximately $\frac{1}{10}$ of the energy is coupled from the waveguide 12 by coupler 14. A single side-band modulator 16 receives the energy coupled by directional coupler 14. The modulator 16 may be of the rotary type as disclosed in my co-pending application Serial No. 427,095. Although I prefer to use a rotary modulator it is to be understood that the signal may be modulated by other means known in the art, as for example, a single side-band modulator using ferrites. The adjustable or variable attenuator 17 is connected to the modulator. The output of the attenuator travels along the waveguide 18 towards the waveguide component 19 on test.

Directional coupler 21 couples a small fraction of the energy travelling along waveguide 12 towards the reference waveguide component 13. Directional coupler 22 similarly couples a small fraction of the energy travelling along waveguide 18 towards the waveguide component under test. The energy coupled by directional couplers 21 and 22 is mixed at 23. These couplers 21 and 22 may be referred to as the forward couplers. Directional coupler 26 couples the energy travelling along waveguide 12 which is reflected by the reference waveguide component 13. Directional coupler 27 similarly couples a small fraction of the energy travelling along waveguide 18 which is reflected from the waveguide component 19 under test. The energy coupled by directional couplers 26 and 27 is mixed at 28. These couplers 26 and 27 may be referred to as the backward couplers. For reasons which will be presently pointed out, the couplers 21, 22, 26 and 27 are selected to have a directivity of at least 40 db.

Microwave mixers 23 and 28 are devices which include means for injection of the local oscillator signal from waveguide 12 and the signal in the test component waveguide 18, and terminals across which an intermediate frequency voltage appears. The intermediate frequency has amplitude and phase which are determined by the amplitude and phase of the microwave energy coupled by couplers 22 and 27. If the modulator shifts the carrier by 200 C. P. S. the intermediate frequency output of the mixer will be 200 C. P. S. Silicon crystal diodes were employed as mixers in the circuit of my invention. The output of one mixer is connected to the horizontal deflecting plates of an oscilloscope 32, and the output of the other mixer is connected to the vertical deflecting plate of the same oscilloscope.

Operation of the apparatus described above is as follows: The microwave signal from the energy source 11 travels along the waveguide 12. The first directional coupler 14 couples energy from this waveguide into the modulator 16. Assuming that the source frequency is instantaneously represented by $f$ and the modulator frequency by $\Delta f$ then the energy leaving the modulator has a frequency equal to $f+\Delta f$.

The energy leaving the single side-band modulator is attenuated by the adjustable or variable attenuator 17. By adjustment of this attenuator the proportion of energy flowing along waveguide 18 in comparison with that flowing along waveguide 12 may be regulated. Directional coupler 21 couples a small percentage of the energy travelling along waveguide 12 towards the reference waveguide component. For most purposes the reference waveguide component is a waveguide short circuit. Consequently, the energy travelling along waveguide 12 toward the short circuit is totally (i. e., 100%) reflected. Directional coupler 26 couples a small percentage of the reflected energy into mixer 28. The forward and reflected energy coupled from waveguide 12 into mixers 23 and 28 acts as the local oscillator power. It is desirable, as will be presently pointed out, that the energy so coupled into the two mixers be equal. This will be true if the couplers 21 and 26 have the same coefficient of coupling and if they couple a relatively small percentage of the total energy. By way of example, let us assume that couplers 21 and 26 are 20 db couplers. A 20 db coupler couples 1% of the total energy. Coupler 21 therefore couples 1% of the energy flowing along waveguide 12 toward the reference short circuit. Consequently, 99% of the energy travels towards the short circuit and is reflected back towards the source. Coupler 26 couples 1% of this energy into mixer 28. We therefore have 1% of the energy travelling along waveguide 12 coupled into a mixer 23 and 0.99% of the energy coupled into mixer 28.

As pointed out above only a small fraction of the source energy is coupled by directional coupler 14 into the modulator 16. Further, this energy is attenuated by the attenuator 17 located at the output of the modulator. The energy travelling along the waveguide 18 therefore is small in comparison to the energy flowing along waveguide 12. Directional couplers 22 and 27 couple the energy travelling toward and reflected from the waveguide component under test. These couplers are chosen so that they couple only a small fraction of the energy into the mixers 23 and 28. Again, waveguide 22 couples such a small portion of the energy that it has little effect upon the amounts of energy coupled by waveguide 27.

The forward and reflected energy coupled by the directional couplers is mixed by the mixers 23 and 28. Figure 2A represents the intermediate frequency output of the mixer 23 while Figure 2B represents the intermediate frequency output of mixer 28. If the two mixers have identical characteristics, the ratio of the amplitudes of the two waves is equal to the amplitude of the voltage reflection coefficient of the component under test and the difference in their phases equals the phase angle of the reflection coefficient of the waveguide component under test relative to a short circuit at plane 19. By connecting the output of the mixer 23 to the horizontal deflection plates, and mixer 28 to the vertical deflection plates of an oscilloscope, a Lissajous figure is derived. This figure will give the magnitude and phase angle of the reflection coefficient of the waveguide component under test. From this, the impedance of the waveguide component under test can be deduced.

In order for the bridge to give correct phase information the bridge must be symmetrical beyond the line 33. The plane of the reference short circuit determines the reference plane along the unknown waveguide component. It is therefore possible to determine the impedance at any plane along a waveguide component by moving the reference along the reference guide 12.

The local oscillator signal is chosen large in comparison to the modulated signals in order to operate along the linear portion of the crystal characteristics. For the apparatus to give exact results it is necessary that the mixers 23 and 28 be matched so that the characteristics are identical at the operating point.

The frequency dependence of the conversion efficiency of the crystal diodes as long as the crystals are matched, is not important since I use comparison techniques. For the same reason the power from the source need not be constant with frequency as long as the crystals are matched at all power levels.

The bridge has its greatest utility in determining the amplitude and phase of waveguide components but it can also be used for comparison of waveguide components.

I claim:

1. In microwave apparatus for measuring the amplitude and phase angle of waveguide impedance components, a source of microwave energy which delivers microwave energy having a predetermined frequency, a first waveguide connected to said source, a reference waveguide impedance component terminating said first waveguide, a directional coupler serving to couple energy from said first waveguide, means for single side-band modulating the microwave energy received from said coupler, said directional coupler coupling a predetermined fraction of the source energy into the modulating means, a second waveguide connected to said modulating means and terminating in the test waveguide impedance component, a first and second waveguide mixing and detecting means, means for coupling microwave energy travelling from the source towards said reference and test waveguide impedance components into the said first mixing and detecting means, means for coupling the microwave energy reflected from said reference and test waveguide impedance components into the said second mixing and detecting means, and means connected to said detecting means for measuring the relative amplitude and phase of said detected signals.

2. Apparatus as in claim 1 including means for attenuating the output of the said modulating means.

3. Apparatus as in claim 1 in which the frequency of the microwave energy is continuously variable over a predetermined frequency band.

References Cited in the file of this patent

UNITED STATES PATENTS 2,596,288    Robertson _____ May 13, 1952

OTHER REFERENCES

"The Review of Scientific Instruments," vol. 22, No. 3, March 1951, article entitled "A phase-shift refractometer" by Tolbert and Straiton, pages 162–165.

"Technique of Microwave Measurements," Montgomery, 1st. edition, McGraw-Hill Book Co., 1947, pages 522, 523.